April 2, 1963
H. A. ROSEN
3,084,295
FERRITE MODULATORS FOR DEVIATING MAGNETRONS
Filed Sept. 30, 1958
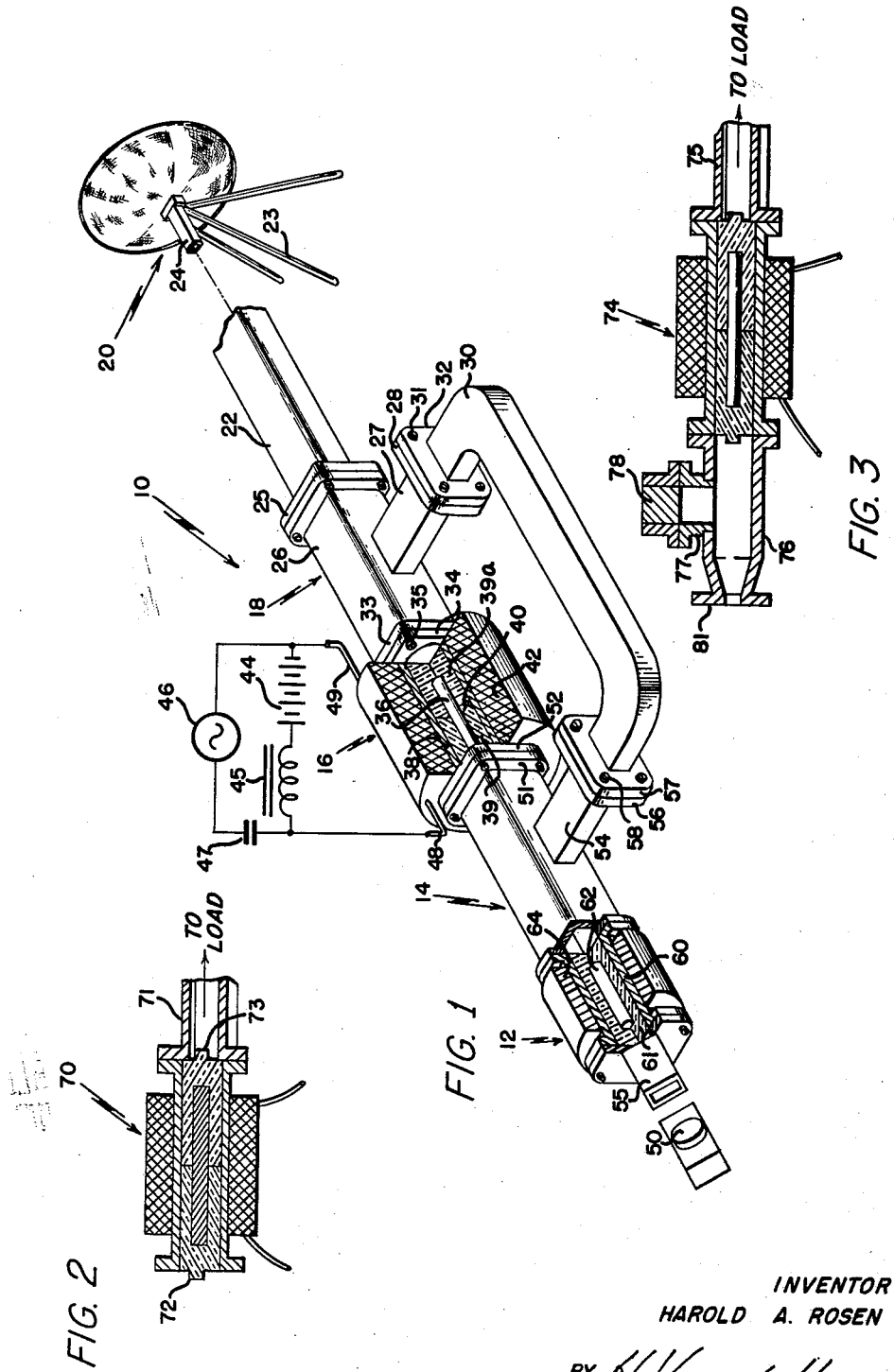
INVENTOR
HAROLD A. ROSEN
BY
ATTORNEY

United States Patent Office 3,084,295
Patented Apr. 2, 1963

3,084,295
FERRITE MODULATORS FOR DEVIATING MAGNETRONS
Harold A. Rosen, Santa Monica, Calif., assignor to Raytheon Company, Lexington, Mass., a corporation of Delaware
Filed Sept. 30, 1958, Ser. No. 765,703
8 Claims. (Cl. 332—51)

This invention relates to waveguide rotating devices and more particularly, to waveguide rotating devices of the ferrite type which combine the function of load isolation and of frequency modulation of a magnetron or similar microwave source in an electromagnetic wave transmission system.

Frequency modulation of magnetrons or similar devices by power supply modulation, sometimes referred to as "pushing," often results in non-linearity of modulation and produces considerable amplitude modulation. However, frequency modulation of a magnetron, for example, by injecting a portion of the magnetron output energy back into the magnetron, sometimes referred to as "pulling," produces a pure frequency modulated signal with no detectable incidental amplitude modulation for substantially all conditions of operation. When a ferrite rotator utilizing the Faraday rotation effect is used in an effort to produce the aforementioned frequency modulation and to provide substantial load isolation, the propagated wave, upon emergency from the rotator, is polarized at a different angle from that of the original wave. This requires that the output section of waveguide to which the rotator is connected be rotated or oriented with respect to the input section of waveguide from the magnetron by an amount equal to the polarization rotation of the electric vector produced by the ferrite rotator. Since a portion of this rotated output must be returned to the magnetron in order to pull it, a backward path must be provided for this signal if linear modulation is to be produced. This is particularly true since, in order to obtain linear modulation, in which the modulation product is proportional to the first power of rotation, the signal is permitted to pass through the ferrite rotator only once.

In numerous applications, therefore, it would be desirable to combine the function of injecting the modulator output back into the magnetron and the function of isolating the load from the magnetron by utilization of the Faraday rotation effect to provide pure frequency modulation of the magnetron without attendant amplitude modulation.

In accordance with the invention, a ferrite rotator which combines the function of frequency modulation of a magnetron and the function of load isolation can be achieved by providing a ferrite element mounted in a circular waveguide or along the longitudinal axis in a square waveguide and providing a magnetic field producing coil in the region of the ferrite element to which is applied a direct current for obtaining a fixed percentage of polarization rotation. An alternating current is also applied to said coil for obtaining a controlled deviation or modulating voltage above and below the fixed rotation voltage. This deviation voltage is injected back into the magnetron to produce linear frequency modulation which is substantially devoid of amplitude deviation. For directing this deviation voltage toward the magnetron, in one embodiment of the invention, input and output T-sections are connected to either side of the ferrite rotator, each T-section having a pair of cross-polarization selective arms. The T-sections are physically rotated with respect to a single polarization at the magnetron by a predetermined angular distance, preferably 45 degrees. This rotation is produced by a separate rotator isolator connected to the magnetron. One arm of the first or input T-section is connected to said rotator isolator and the first arm of the second or output T-section is connected to a load. The other arm of the first or input T-section extends in a direction perpendicular to the axis of the first arm and is connected to the remaining arm of the second or output T-section to provide a separate return path for the deviated energy resulting from the alternating current modulation voltage applied to the ferrite rotator. Thus, by applying a modulating voltage to the ferrite rotator, an alternating current deviation for an angular distance of preferably one or two percent is superimposed upon the direct current field in order to pull the frequency of the magnetron in response to the frequency of the applied alternating current field. The isolation rotator is adjusted to provide a rotation of 45 degrees to compensate for the physical rotation of the magnetron with respect to the remaining waveguide structure. In this manner, substantially pure frequency modulation can be provided by pulling the magnetron, which, when modulated by conventional plate modulation, usually produces a mixture of frequency modulation and amplitude modulation. Moreover, relatively extensive modulation and power supply equipment normally required to produce power supply modulation can be replaced by this relatively low power waveguide rotation device.

Other objects and advantages will be more readily perceived upon analysis of the drawing, in which:

FIG. 1 is an isometric view, partly in section, of the ferrite modulator according to the invention;

FIG. 2 is a side view, partly in section, of another embodiment of the invention; and FIG. 3 is a side view, partly in section of a further embodiment of the invention.

Referring now to FIG. 1, a ferrite modulator is indicated generally by the reference numeral 10 and includes a rotator isolator 12, an input T-section of waveguide 14, a ferrite rotator 16 and an output T-section of waveguide 18, the main arm of which is connected to a load, such as antenna 20. More particularly, FIG. 1 shows a rectangular output section of waveguide 22 adapted to be connected to the antenna 20, which is supported by legs 23 attached to the dish portion of the antenna and having a rectangular input antenna waveguide section 24, adapted to be coupled to output waveguide section 22. For purposes of keeping the drawing to a reasonable size, the antenna is shown drawn to a different scale, the waveguide 24 being of a sufficient size to couple to output section 22. A flange 25 is shown which couples the rectangular waveguide section 22 to the square portion 26 of the output T-section 18. This portion functions as an output section of waveguide and includes a rectangular arm 27, which cooperates with the output T-section 18 to provide a pair of conjugately related terminals or branches in that a wave launched in either one will not appear at the other. The rectangular arm 27 is provided with a flange 28 which may be integral therewith and is connected to a waveguide return section 30 by means of screws 31 and a corresponding flange 32.

The ferrite rotator 16 is connected to the square portion of the T-section of waveguide 18 by means of a waveguide flange 33 connected to rotator flange 34 by screws 35.

It should be understood that any standard type rotator may be used, provided the proper polarization and mode of energy is thereby obtained. It is obvious to one skilled in the art that a number of well-known rotation means may be employed.

In the present instance, rotator 16 includes a cylindrical ferrite element 36, positioned within a section of circular waveguide 28 by means of low-loss sections of dielectric material 39 and 39a, such as Teflon, which acts as a solid supporting medium for the ferrite element 36. The Teflon dielectric material may be cut to the inner diameter of the circular waveguide section 38 and divided into two sections 39 and 39a, as shown at 40 in the region of the ferrite element, a hole bottom-drilled into each section, and the ferrite element slidably inserted into the Teflon. Many other methods for mounting the ferrite within the Teflon or other materials will suggest themselves to those skilled in the art.

The ferrite rotator 16 further includes a magnetic field producing means, such as field coil 42, surrounding the circular waveguide 38 in the region of the ferrite element 36. The field coil 42 is connected to separate power supply means for obtaining both static and dynamic polarization rotation from the ferrite rotator 16. As shown, a direct current field, produced by means of a direct current source 44, is connected in series with an isolation choke 45, which prevents the alternating current source 46 from being applied across the direct current source 44. The alternating current source 46, which produces a deviating voltage is fed by way of a blocking condenser 47 to one terminal 48 of field coil 42, and the other side of the source or generator 46 is connected to the oppositely-disposed terminal 49 to provide an alternating deviation voltage at the frequency at which it is desirable to modulate the microwave source, herein shown as a magnetron 50. The capacitor 47 prevents the direct current source 44 from being applied across the alternating current source 46. In this manner, direct current and alternating current fields may be applied simultaneously to the field coil 42 in order to rotate the polarized energy in the rotator and to produce a voltage which is fed back to the magnetron 50 by way of the waveguide return section 30.

The input T-section 14 is connected to the ferrite rotator 16 by means of a flange 51 in register with the ferrite rotator input flange 52. Extending from the input T-section and integral therewith is the rectangular arm 54 which is connected to the waveguide return section 30 by a flange 56, integral with the rectangular arm 54, and connected to the return section flange 57 by means of screws 58. The other arm of the T-section 14 is connected directly to the rotator isolator 12, which in turn is connected to the magnetron source of microwave energy 50 by means of the rectangular waveguide section 55. This section is shown in FIG. 1 rotated by an angle of 45 degrees with respect to one polarization of the input T-section 14. In particular, the rotator isolator 12 comprises a section of circular waveguide 60 filled with Teflon or similar dielectric material 61 and supporting a ferrite element 62 axially positioned within the low-loss dielectric material. A separate magnetic field producing means 64 surrounds the circular waveguide section 60 in the region of the ferrite element 62. This field producing means may, as shown, consist of a permanent magnet of sufficient strength to produce a non-reciprocal 45 degree rotation of the microwave energy passing through the ferrite material in the forward and reverse directions. Consequently, the rotator isolator is used as a lossless coupler for injecting the modulation or deviated voltage appearing in the waveguide return section 30 back into the magnetron and additionally for providing substantial load isolation. The rotator isolator, therefore, allows only signals entering rectangular arm 54 to reach the magnetron, these signals being the deviated voltage output of the ferrite rotator 16.

In operation, therefore, microwave energy from the magnetron 50 entering the waveguide 55 will enter the isolator rotator 12, where it is rotated a predetermined number of degrees, preferably 45 degrees, by the fixed magnetic field applied to the ferrite element 62. This energy flows through the ferrite rotator 16 and the output T-section 18 and into the load. However, a portion of the energy is deviated by the alternating current field which also is applied to ferrite element 36 and this deviated energy returns by way of the waveguide return section 30 through the isolator rotator 12 where it is rotated another 45 degrees and enters magnetron 50 to pull or change its operating frequency. In this manner, pure frequency modulation is obtained by means of only a small variation from 45 degrees and, consequently, a relatively small amount of modulating energy is required to pull the magnetron.

Referring now to FIG. 2, another embodiment of the ferrite modulator of FIG. 1 is shown wherein a non-reciprocal 45 degree ferrite Faraday rotator 70 is inserted between a magnetron, not shown, and an output waveguide 71, which, in turn, is physically rotated 45 degrees with respect to one polarization of energy entering the ferrite rotator from the magnetron. In this instance, matching buttons 72 and 73 are preferably used to match the input and output waveguides to the ferrite rotator. If the rotation of the energy in the ferrite rotator is not 45 degrees, all of the energy will not be coupled into waveguide 71. This energy which is not rotated in a manner to couple into waveguide 71 will be reflected from the apparent short circuit caused by the cross-polarized waveguide 71. The energy so reflected returns through the ferrite rotator and is additionally rotated another 45 degrees. The two rotations of approximately 45 degrees plus the 90 degree rotation resulting from the deviation of the ferrite rotation from 45 degrees, cause the energy emerging at button 72 to be in the proper polarity to couple with the magnetron. Thus, in applications where the isolation of a ferrite rotator is not required, the separate return path is eliminated, resulting in an extremely compact modulator of approximately two inches in length.

FIG. 3 shows another embodiment of the ferrite modulator comprising a ferrite Faraday rotator 74 connected to an output waveguide 75 which is rotated an angular distance of approximately 45 degrees with respect to an input T-section 76 which, in turn, is connected to a magnetron, not shown. The input T-section 76 includes a side arm 77 which is terminated in a well-known energy sump or matched termination 78, such as a section of waveguide filled with Polyiron, or similar non-reflecting material adapted to absorb electrical energy. This matched termination acts as a sump for energy reflected from the load section 75. As noted, energy reflected from a load connected to waveguide section 75 will be isolated from the magnetron or similar microwave source connected to flange 81 of input T-section 76. The reflected energy, after being rotated 45 degrees, will be absorbed by the matched termination 78. Microwave energy deviated from the 45 degree center frequency by modulation applied to ferrite rotator 74 will be directed toward the magnetron, not shown, connected to input flange 81. With the exception of the additional isolating sump 78, the device deviates the magnetron in the same manner as the rotator shown in FIG. 2, in that energy not coupled to the load line 75 is reflected back into the magnetron. In this manner, load isolation and modulation of reflected energy occurs to produce substantially pure frequency modulation of the magnetron.

It should be understood that the microwave generator can consist of a klystron or magnetron regardless of whether or not cavity stabilization is employed. Furthermore, while a direct current may be applied to the field coils of the ferrite rotators shown in the drawing to produce a fixed polarization rotation, the combination of a fixed magnetic field produced by a permanent magnetic and an alternating current applied to one or more field coils can be combined to produce a fixed rotation in combination with a deviation voltage for pulling the microwave source.

This completes the description of the embodiments of the invention illustrated herein. However, many modifications and advantages thereof will be apparent to persons skilled in the art without departing from the spirit and scope of this invention. Accordingly, it is desired that this invention not be limited to the particular details of the embodiments disclosed herein except as defined by the appended claims.

What is claimed is:

1. In combination, a waveguide adapted to receive microwave energy, a first rotating element for rotating said microwave energy through an angle of forty-five degrees connected to one end of said waveguide, first and second T-sections of waveguide each having a pair of cross-polarized input arms and an output arm, an input arm of the first of said sections adapted to be connected to the output of said first rotating element, said waveguide rotated a predetermined angular distance with respect to one of the polarizations of microwave energy in said first T-section, a load connected to the output arm of said second section, a second rotating element interposed between and connected to the output arm of said first section and an input arm of said second section, a return section of waveguide connecting an input arm of said first and second sections other than the arms to which said rotating elements are already connected, said second rotating element adapted to provide a fixed rotation of a predetermined number of degrees, and an alternating magnetic field applied to said second rotating element whereby a portion of the microwave energy in said second rotating element is returned to said first rotating element.

2. A waveguide modulating device for providing modulation of a microwave source of electromagnetic energy comprising a waveguide isolating element adapted to receive and rotate linearly polarized microwave energy from a source of microwave energy, first and second T-sections of waveguide each having a pair of cross-polarized input arms and an output arm, an input arm of the first of said sections adapted to be connected to said isolating element and rotated a predetermined angular distance with respect to one of the polarizations of microwave energy entering said isolating element from said microwave source, a load connected to the output arm of the second of said sections, a ferrite rotating element interposed between and connecting an input arm of said second section to the output arm of said first section, a waveguide return section connecting the other input arm of said first and second sections, means for applying a direct current to said ferrite rotating element to rotate the plane of polarization of said electromagnetic energy by a predetermined angular distance, and means for impressing an alternating current on said direct current to produce a modulation voltage in said waveguide return section to change the frequency of said microwave source.

3. A system for providing modulation of a microwave source of energy comprising a polarization rotation element adapted to receive and rotate linearly polarized microwave energy from a magnetron, a first T-section of waveguide having input arms and an output arm, one input arm adapted to be connected to the output of said rotation element and rotated a predetermined angular distance with respect to one polarization of microwave energy entering said rotation element from said magnetron, a load, a second T-section of waveguide having input arms and an output arm, said output arm connected to said load, a ferrite rotating element interposed between and connecting the output arm of said first of said T-sections with an input arm of the second T-section, a waveguide return section connecting the other input arm of said first and second T-sections, means for applying a direct current to said ferrite rotating element to rotate the plane of polarization of microwave energy from said magnetron a predetermined angular distance, and means for impressing an alternating current on said direct current to produce a modulating feedback voltage in said waveguide return section and in said rotation element to pull the frequency of said magnetron in a predetermined direction.

4. A system for providing modulation of a microwave source of energy comprising a rotation element adapted to receive and rotate linearly polarized microwave energy from a magnetron, a first T-section of waveguide adapted to be connected to the output of said rotation element and rotated a predetermined angular distance with respect to one polarization of microwave energy entering said rotation element from said magnetron, a second T-section of waveguide having input arms and an output arm, a load connected to the output arm of said second T-section, a ferrite rotating element interposed between and connecting the output arm of said first of said T-sections with an input arm of said second T-section, a waveguide return section connecting the other input arms of said first and second T-sections, and means for applying an alternating current to said rotating element to introduce a modulating feedback voltage in said polarization rotation element, said rotation element adapted to inject said modulating feedback voltage into said magnetron to provide substantially linear modulation of said microwave energy from said magnetron.

5. In combination, a T-section of waveguide having cross-polarized rectangular input arms and an output arm, a source of microwave energy feeding one of said input arms, a ferrite rotating element connected to said output arm, an output waveguide section connected to said ferrite rotating element and physically rotated a predetermined angular distance with respect to one polarization in said output arm, a load connected to said output section, a matched termination connected to the other of said input arms of said T-section for continuously absorbing energy reflected from said load, thereby isolating said reflected energy from said microwave source, and a separate alternating current connected to said ferrite rotating element for feeding a portion of energy not coupled to said load into said microwave source to modulate said microwave source.

6. In combination, a T-section of waveguide having cross-polarized rectangular input arms and an output arm, a source of microwave energy feeding one of said input arms, a ferrite rotating element connected to said output arm, an output waveguide section connected to said ferrite rotating element and physically rotated a first angular distance with respect to said output arm, said output waveguide section adapted to be connected to a load, a matched termination connected to the other of said input arms of said T-section adapted to continuously absorb energy reflected from said load, thereby isolating energy from said microwave source, a separate source of alternating current connected to said ferrite rotating element for feeding a modulation voltage back into said microwave source to modulate said microwave source, and a source of direct current applied to said ferrite rotating element to rotate a portion of said energy not coupled to said load a second angular distance corresponding approximately to said physical rotation of said output waveguide section whereby said energy not entering said load is directed into said matched termination.

7. A system for providing frequency modulation of a microwave source of electromagnetic energy comprising a source of electromagnetic energy, a first rectangular waveguide section connected to said source of electromagnetic energy, a load, a second rectangular waveguide section connected to said load and rotated a predetermined angular distance with respect to one polarization of electromagnetic energy in said first rectangular waveguide section, whereby a portion of said electromagnetic energy is not coupled to said load, a matched termination adapted to continuously absorb electromagnetic energy reflected from said load, a polarization rotating element interposed between and connected to said first and second waveguide sections, direct current means connected to said polarization rotating element for establishing a fixed rotation of the plane of polarization of electromagnetic energy entering said load, and alternating current means connected to said polarization rotating element for providing a deviation in the portion of said non-coupled electromagnetic energy reflected from said load into said magnetron to change the frequency of said magnetron.

8. A system for providing frequency modulation of a microwave source of electromagnetic energy comprising a source of electromagnetic energy, a first waveguide structure adapted to support microwave energy in two polarizations connected to said source of electromagnetic energy, a load, a second waveguide structure adapted to support electromagnetic energy in two polarizations connected to said load and physically rotated a predetermined angular distance with respect to one of said polarizations in said first waveguide structure, a polarization rotating element interposed between and connected to said first and second waveguide structures, a matched termination positioned at an angle adapted to continuously absorb electromagnetic energy reflected from said load, a source of direct current feeding said ferrite rotating element to provide a fixed angular rotation of the plane of polarization of the portion of electromagnetic energy coupled to said load through said second waveguide structure, said fixed angular rotation corresponding to the physical angular rotation of said second waveguide structure, and an alternating current connected to said polarization rotating element to direct a portion of said electromagnetic energy into said magnetron.

References Cited in the file of this patent
UNITED STATES PATENTS 2,644,930    Luhrs et al. _____ July 7, 1953
2,887,664    Hogan _____ May 19, 1959

OTHER REFERENCES

"Electronics," May 1955, pp. 139–141.